(12) United States Patent
Tian et al.

(10) Patent No.: US 12,377,452 B2
(45) Date of Patent: Aug. 5, 2025

(54) METHOD FOR EXTRACTING AND SEPARATING SALT ALKALI FROM SALINE ALKALI SOIL AND SOIL IMPROVEMENT

(71) Applicant: Tarim University, Alar (CN)

(72) Inventors: Weiliang Tian, Alar (CN); Baolin Zhu, Alar (CN); Feng Ren, Alar (CN); Jinpeng Hou, Alar (CN); Zhong Li, Alar (CN); Yiwen Shen, Alar (CN); Huiping Ding, Alar (CN); Xiaodong Lei, Alar (CN)

(73) Assignee: Tarim University, Alar (CN)

( * ) Notice: Subject to any disclaimer, the term of this patent is extended or adjusted under 35 U.S.C. 154(b) by 302 days.

(21) Appl. No.: 18/325,889

(22) Filed: May 30, 2023

(65) Prior Publication Data
US 2023/0302511 A1    Sep. 28, 2023

(30) Foreign Application Priority Data
Jul. 14, 2022 (CN) .......................... 202210833242.3

(51) Int. Cl.
| | |
|---|---|
| *B09C 1/08* | (2006.01) |
| *C01F 7/785* | (2022.01) |
| *C09K 17/42* | (2006.01) |
| *C09K 109/00* | (2006.01) |

(52) U.S. Cl.
CPC ............... *B09C 1/08* (2013.01); *C01F 7/785* (2022.01); *C09K 17/42* (2013.01); *B09C 2101/00* (2013.01); *C01P 2002/22* (2013.01); *C09K 2109/00* (2013.01)

(58) Field of Classification Search
CPC ......... B09C 1/08; B09C 2101/00; B09C 1/02; C01F 7/785; C09K 17/42; C09K 2109/00; C01P 2002/22; Y02A 40/22
See application file for complete search history.

(56) References Cited

U.S. PATENT DOCUMENTS

| | | | |
|---|---|---|---|
| 10,835,938 B1 * | 11/2020 | Lu | .............................. B09C 1/02 |
| 2015/0056021 A1 | 2/2015 | Guo et al. | |
| 2019/0090409 A1 * | 3/2019 | Wang | ..................... A01G 22/00 |
| 2023/0075076 A1 | 3/2023 | Sha | |

* cited by examiner

*Primary Examiner* — Carib A Oquendo
(74) *Attorney, Agent, or Firm* — Hemisphere Law, PLLC; Zhigang Ma

(57) ABSTRACT

A method for extracting and separating salt alkali from saline alkali soil and soil improvement is disclosed. A foundation pit, square convex edge and cylindrical partition are arranged on a saline alkali land. Nitric or phosphoric acid solution is added to obtain a saline alkali pool. A trench is set around, and/or, a cylinder is set in the center of saline alkali pool. The evaporating material is prepared from vermiculite, laid on plastic wrapping material, and/or added into the cylinder. The salt alkali is precipitated and enriched through natural evaporation. The evaporating material enriched with salt alkali is taken out to be dissolved, separated and washed to obtain saline alkali solution and vermiculite or evaporating material. The vermiculite material is returned for reuse, and the above process is repeated. Alkali solution and intercalation agent are added into saline alkali solution to react and crystallize to obtain functional materials.

10 Claims, 4 Drawing Sheets

METHOD FOR EXTRACTING AND SEPARATING SALT ALKALI FROM SALINE ALKALI SOIL AND SOIL IMPROVEMENT

CROSS REFERENCE TO RELATED APPLICATION

This patent application claims the benefit and priority of Chinese Patent Application No. 202210833242.3 filed on Jul. 14, 2022, the disclosure of which is incorporated by reference herein in its entirety as part of the present application.

TECHNICAL FIELD

The present disclosure relates to the technical field of saline alkali soil improvement, and more specifically, to a method for extracting and separating salt alkali from saline alkali soil and soil improvement.

BACKGROUND ART

Saline alkali land is a kind of salt accumulation, which means that the salt in the soil affects the normal growth of crops. According to incomplete statistics of UNESCO and FAO, the area of saline alkali land in the world is 954.38 million hectares, including 99.13 million hectares in China. The formation of alkaline soil and alkalized soil in China is mostly related to the accumulation of carbonate in soil. Therefore, the alkalinity is generally high, and plants can hardly survive in severe saline alkali soil areas.

At present, there are four methods to improve saline alkali soil in China: physical improvement, water conservancy improvement, chemical improvement and biological improvement. These methods have played an important role in improving saline alkali land and agricultural production, and brought great benefits. However, a single way of saline alkali soil improvement has various defects. For example, physical improvement is to increase soil porosity by deep tillage and loosening soil, which is conducive to salt removal. However, if there is no chemical improvement method (ion replacement), it is difficult to remove the salt ions adsorbed by soil colloids, and loose soil is only temporary. Biological improvement is the use of organisms (plants or microorganisms) to immobilize or absorb salt in the soil in plants. However, the salt that has been immobilized or absorbed still exists in this soil area. Without follow-up measures, it will lead to the risk of secondary salinization of soil at any time.

Therefore, how to effectively realize the soil improvement of saline alkali land is an urgent problem for those skilled in the art.

SUMMARY

In view of above, the purpose of the disclosure is to provide a method for extracting and separating salt alkali from saline alkali soil and soil improvement, so as to solve the shortage of the prior art.

In order to achieve the above purpose, technical schemes of the present disclosure are specifically described as follows.

A method for extracting and separating salt alkali from saline alkali soil and soil improvement includes the following steps.
(1) A foundation pit is excavated on a saline alkali land, a square convex edge is built, a cylindrical partition is set around inner side, a nitric acid solution or phosphoric acid solution is added and a saline alkali pool is obtained.
(2) A trench is set around the saline alkali pool. The bottom of the trench is lower than a plane of the saline alkali pool. And/or, a cylinder is set in a center of the saline alkali pool.
(3) A raw vermiculite is expanded to obtain an expanded vermiculite precursor, a catalyst and a light absorbing material are added and mixed evenly, and then a catalysis is performed to obtain an evaporating material.
(4) A trench side partition and a trench bottom partition with holes are placed at bottom on both sides of the trench, then a plastic wrapping material is laid in the trench side partition or the trench bottom partition with holes at bottom, and the vermiculite or the evaporating material is laid evenly on the plastic wrapping material. And/or, the vermiculite or the evaporating material is added into the cylinder. The saline alkali soil absorbs heat, evaporates and precipitates saline alkali under the sunlight, and the salt alkali is enriched on the vermiculite or the evaporating material. Then a vermiculite or evaporating material saline alkali mixture is obtained.
(5) The vermiculite or evaporating material saline alkali mixture is dissolved, separated and washed to obtain a saline alkali solution and the vermiculite or evaporating material for recycling.
(6) The vermiculite or evaporating material is returned to the saline alkali pool and step (4) and step (5) are repeated more than three times. Saline alkali ions in the saline alkali soil are enriched and collected together for standby to realize a basically complete separation and extraction of salt alkali in the saline alkali soil.
(7) An alkali solution and an intercalation agent are added into the repeatedly recovered saline alkali solution for reaction to obtain an intercalated Mg—Al hydrotalcite. The intercalated Mg—Al hydrotalcite is recrystallized to obtain a layered intercalated hydrotalcite functional material MgAl-LDHs.
(8) The expanded vermiculite is modified, crushed and sieved to obtain a fine-grained vermiculite, then the layered intercalated hydrotalcite functional material MgAl-LDHs and an organic matter are added and returned to the saline alkali pool to comprehensively improve the saline alkali soil and achieve the control of the saline alkali land.

Further, in the above step (1), an area of the saline alkali pool is 1-200 $m^2$, a depth of the cylindrical partition into the soil is 0.5-3 m, a protruding height of the inner side is 0.1-5 m, the outer side is 1-5 cm above the bottom, and a water level height after adding the nitric acid solution or phosphoric acid solution is 0.01-2 m.

The beneficial effect of adopting the above further technical scheme is that the saline alkali ions in the saline alkali pool are uniformly enriched into the trench through the control of the water flow channel.

Further, in the above step (1), a concentration of the nitric acid solution and phosphoric acid solution is 0.001-0.1 mol/L.

The beneficial effect of adopting the above further technical scheme is that adding nitric acid solution or phosphoric acid solution, on the one hand, releases carbonate ions in the soil and then constructs an ion channel to realize the transportation of saline alkali ions, on the other hand, increases nitrogen fertilizer or phosphorus fertilizer in the soil.

Further, in the above step (2), a width of the trench is 0.1-5 m and a bottom of the trench is 0.1-1 m lower than the plane of the saline alkali pool.

The beneficial effect of adopting the above further technical scheme is that the height difference (pressure difference) is used to realize the rapid transportation of saline alkali ions and achieve the rapid enrichment of saline alkali ions.

Further, in the above step (2), multiple cylinder bottom plates are arranged at the bottom of the cylinder, and the cylinder bottom plates are arranged in the saline alkali soil.

The beneficial effect of adopting the above further technical scheme is that the bottom plate of the cylinder is hollow, filled with the hydrophilic evaporation material or adsorption material, which has an ultrastrong capillary phenomenon and plays the role of conveying liquid.

Further, in the above step (3), an expansion temperature is 500-1000° C., the catalyst is at least one of ferrocene, iron, cobalt and nickel, and the light absorbing material is titanium and/or selenium.

The beneficial effects of adopting the above further technical scheme are as follows. The catalyst is used to prepare vermiculite carbon nanotube organic-inorganic composite materials to achieve efficient adsorption of hollow materials. The black carbon nanotube helps absorb light and convert it into heat. In addition, the addition of light absorbing materials can better absorb heat, help evaporation of water, and better separate and enrich saline alkali.

Further, in the above step (4), the plastic wrapping material is a porous wrapping material or a black plastic woven bag, and the plastic wrapping material is water permeable and breathable, and can quickly transport salt ion aqueous solution.

The beneficial effects of adopting the above further technical scheme are as follows. Black plastic woven bags can absorb heat better, which are placed under the vermiculite or evaporation material. The most important is that this facilitates the recycling of vermiculite or evaporating material and enables the delivery of saline alkali aqueous solution at an inexpensive cost.

Further, in the above step (4), the following steps are also included. A solar substrate is placed on the surrounding partition and the cylinder to convert solar energy into electric energy for storage. And at the same time, an electric heating wire is arranged in the vermiculite or evaporating material to continue the evaporation through the electric heating wire at night.

The beneficial effect of adopting the above further technical scheme is that a continuous 24 h rapid enrichment of the saline alkali is achieved Further, in the above step (7), the alkali solution is at least one of urea, sodium hydroxide, ammonia and potassium hydroxide, with a concentration of 0.1-1 mol/L. And the intercalation agent is an organic substance of nitrogen, phosphorus, potassium and sulfur, at least one of calcium, magnesium, iron, zinc, copper, manganese, molybdenum and boron, with a concentration of 0.1-1 mol/L.

The beneficial effect of adopting the above further technical scheme described above lies in the ability to better form the intercalated Mg—Al hydrotalcite, which contains a large amount of nutrients required for crop growth and contributes to the comprehensive improvement of saline alkali land.

Further, in the above step (8), a mesh size of the fine-grained vermiculite and organic matter sieved is at least one of 10 mesh, 20 mesh, 40 mesh, 60 mesh and 80 mesh. And the organic matter is at least one of wood vinegar, organic fertilizer, soil regulator, lysine, animal manure, biomass charcoal and straw leaf ash.

The beneficial effects of employing the further technical scheme described above are as follows. Large porosity is provided by the fine-grained vermiculite, which achieves the function of air permeability and moisture retention of soil and provides a good growth space for crops. The organic matter can improve the fertility properties of soils, promote the physiological activity of plants and improve the ecological environment, achieve rapid improvement and treatment of saline alkali soil, and shorten the treatment cycle.

According to the above technical schemes, compared with the prior art, the disclosure has the following beneficial effects.

The present disclosure achieves the separation of salt alkali from saline alkali soil and improves the saline alkali soil with simple process, significant effect, low energy consumption and rapid extraction and separation, which overcomes the previous difficulties of low efficiency of salinity reduction with water, and then achieves the improvement of saline alkali soil. The present disclosure will strongly promote the development and utilization of saline alkali land, serving the rejuvenation of villages.

Figure 1:
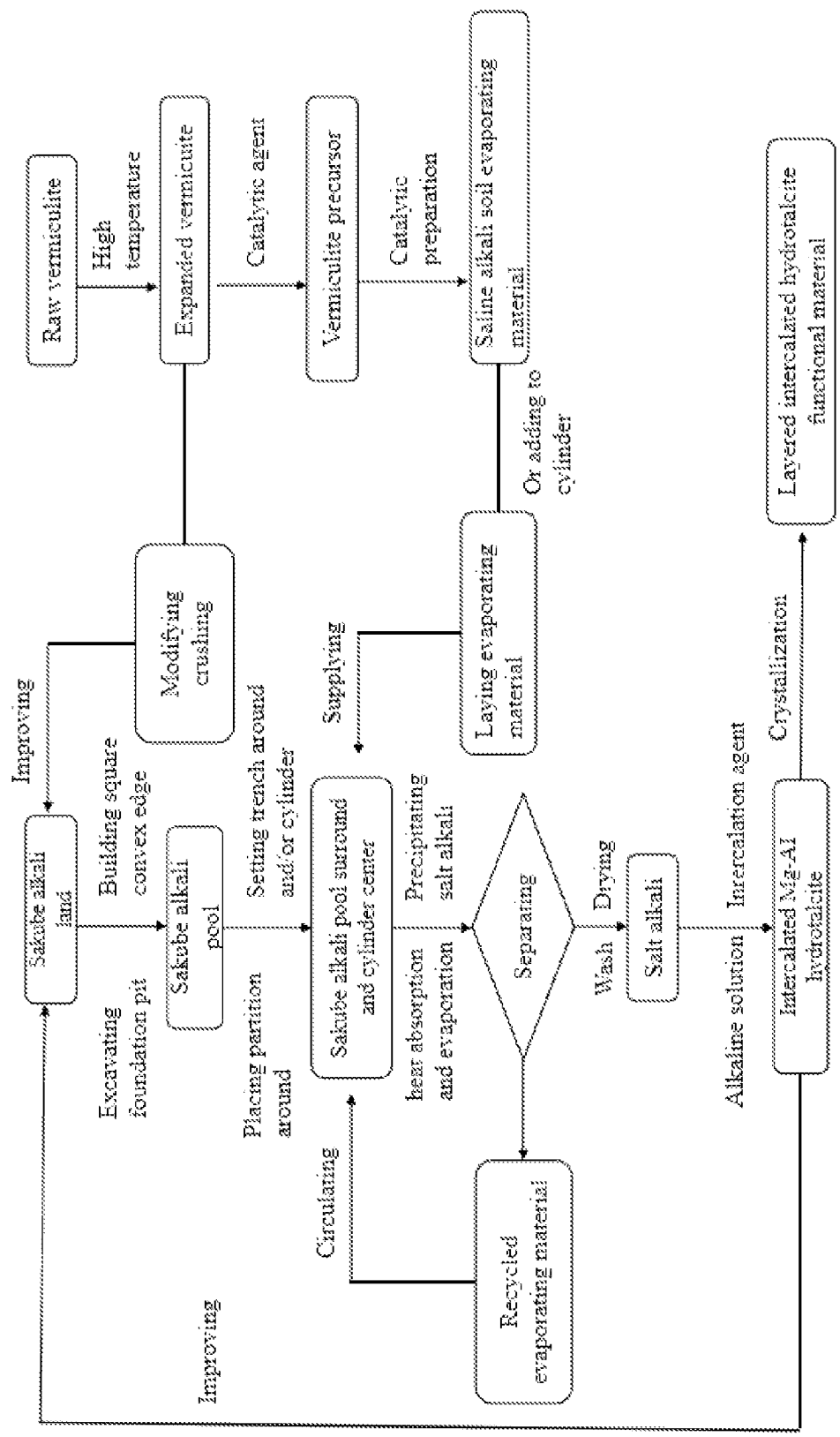
FIG. 1 is a process flow chart of extracting and separating saline alkali soil and soil improvement provided by the present disclosure.

Wherein, 1—cylindrical partition, 2—trench bottom partition, 3—trench side partition, 4—vermiculite or evaporating material, 5—black plastic woven bag, 6—solar substrate, 7—saline alkali soil, 8—horizon, 9—heating wire, 10—cylinder, 11—cylinder bottom plate.

DETAILED DESCRIPTION OF THE EMBODIMENTS

Technical solutions in the embodiments of the present disclosure will be clearly and completely described below. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Performance Testing

1. Pre Experimental:
    (1) 50 g of the light saline alkali soil was weighed and placed in a beaker with 200 mL of water. The beaker was placed in a 50° C. water bath and stirred for 30 min, and the solution in the beaker was finally poured into a centrifuge tube for centrifugation at 8000 r/min for 10 min. The upper salt solution was taken out and placed in a clean beaker for further use. The bottom saline alkali soil was again placed in a beaker and 200 mL water was added. The above operation was repeated three times. The upper salt solution after being washed three times with water was placed in an oven at 90° C. for 24 h, followed by evaporating dry water and precipitating the salt alkali, which was weighed as 1.2 g, so the salt content was 2.4%.

(2) 50 g of the light saline alkali soil was weighed and placed in a beaker with 200 mL of water and 10 mL of $HNO_3$ solution with a concentration of 65%. The beaker was placed in a 50° C. water bath and stirred for 30 min, and the solution in the beaker was finally poured into a centrifuge tube for centrifugation at 8000 r/min for 10 min. The upper salt solution was taken out and placed in a clean beaker for further use. The bottom saline alkali soil was again placed in a beaker, and 200 mL water and 10 mL of $HNO_3$ solution with a concentration of 65% were added. The above operation was repeated three times. The upper salt solution after being washed three times with water was placed in an oven at 90° C. for 24 h, followed by evaporating dry water and precipitating the salt alkali, which was weighed as 7.42 g, so the salt content was 14.84%.

(3) 50 g of the heavy saline alkali soil was weighed and placed in a beaker with 200 mL of water. The beaker was placed in a 50° C. water bath and stirred for 30 min, and the solution in the beaker was finally poured into a centrifuge tube for centrifugation at 8000 r/min for 10 min. The upper salt solution was taken out and placed in a clean beaker for further use. The bottom saline alkali soil was again placed in a beaker and 200 mL water was added. The above operation was repeated three times. The upper salt solution after being washed three times with water was placed in an oven at 90° C. for 24 h, followed by evaporating dry water and precipitating the salt alkali, which was weighed as 26.21 g, so the salt content was 52.42%.

(4) 50 g of the heavy saline alkali soil was weighed and placed in a beaker with 200 mL of water and 10 mL of $HNO_3$ solution with a concentration of 65%. The beaker was placed in a 50° C. water bath and stirred for 30 min, and the solution in the beaker was finally poured into a centrifuge tube for centrifugation at 8000 r/min for 10 min. The upper salt solution was taken out and placed in a clean beaker for further use. The bottom saline alkali soil was again placed in a beaker, and 200 mL water and 10 mL of $HNO_3$ solution with a concentration of 65% were added. The above operation was repeated three times. The upper salt solution after being washed three times with water was placed in an oven at 90° C. for 24 h, followed by evaporating dry water and precipitating the salt alkali, which was weighed as 39.43 g, so the salt content was 78.76%.

The pre experiments showed that: acid washing was easier than water washing to completely precipitate the salt alkali, and the salt content of light saline alkali soil was 14.84% and the salt content of heavy saline alkali soil was 78.76%.

Embodiment 1

Figure 2:
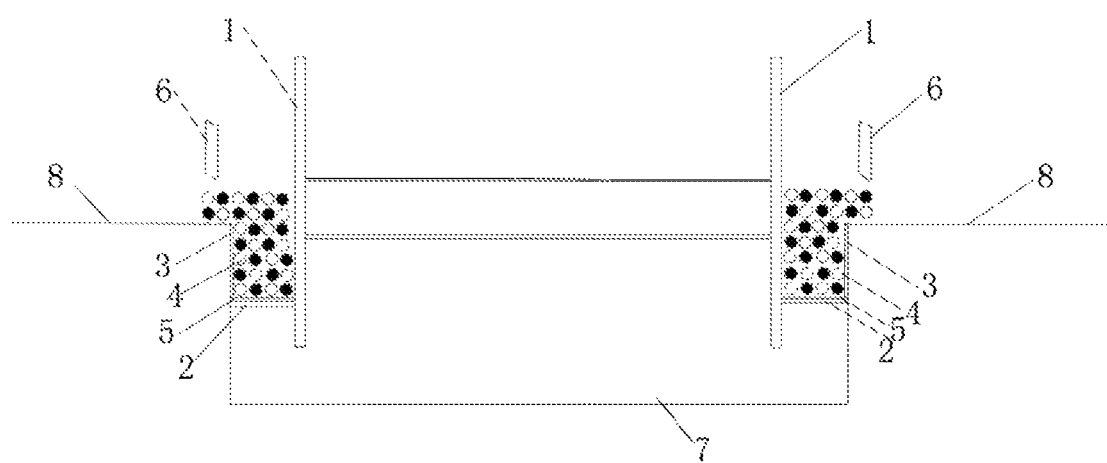
FIG. 2 is a schematic diagram of the structure when the vermiculite or evaporating material is placed only in the trench provided by the present disclosure.

The method for extracting and separating salt alkali and soil improvement, as shown in FIG. 1 and FIG. 2, specifically included the following steps.

(1) A foundation pit was excavated on a saline alkali land, a square convex edge was built, and a cylindrical partition 1 was set around inner side. The depth of the cylindrical partition 1 into the soil was 0.5 m, and the protruding height was 1 m. The water was added till the water level height was 0.1 m. And a saline alkali pool with an area of 1 $m^2$ as shown in FIG. 2 was obtained.

(2) A trench with a width of 0.1 m was set around the saline alkali pool, and the bottom of the trench was 0.1 m below the plane of the saline alkali pool.

(3) A raw vermiculite was expanded at 900° C. to obtain an expanded vermiculite. The expanded vermiculite precursor was obtained by adding iron catalyst and titanium light absorbing material, and then the evaporating material 4 (vermiculite based carbon nanotube composite saline alkali soil adsorption) was obtained by catalysis.

(4) A trench side partition 3 and a trench bottom partition 2 with holes were placed at bottom on both sides of the trench, then a water permeable and breathable black plastic woven bag 5 was laid in the trench side partition 3 and the trench bottom partition 2 with holes at bottom, and the evaporating material 4 was laid evenly on the black plastic woven bag 5. The saline alkali soil 7 in the trench around the saline alkali pool absorbed heat, evaporated and precipitated salt alkali under the sunlight, and the salt alkali were enriched on the evaporating material 4. Then the evaporating material saline alkali mixture was obtained.

And a solar substrate 6 was placed on the cylindrical partition 1 to convert solar energy into electric energy for storage. And at the same time, an electric heating wire 9 was arranged in the evaporating material 4 to continue the evaporation through the electric heating wire 9 at night.

(5) The evaporating material saline alkali mixture was dissolved, separated and washed to obtain the saline alkali solution and the evaporating material 4 for recycling.

(6) The evaporating material 4 was returned to the saline alkali pool, and step (4) and step (5) were repeated more than three times. Saline alkali ions in the saline alkali soil 7 were enriched and collected together for standby to realize a basically complete separation and extraction of salt alkali in the saline alkali soil 7.

(7) 0.1 mol/L sodium hydroxide solution and 0.1 mol/L rare earth element intercalation agent were added into the repeatedly recovered saline alkali solution for reaction to obtain an intercalated Mg—Al hydrotalcite. The intercalated Mg—Al hydrotalcite is recrystallized to obtain a layered intercalated hydrotalcite functional material MgAl-LDHs.

(8) The expanded vermiculite was modified, crushed and sieved with a 50-mesh sieve to obtain a fine-grained vermiculite, then the layered intercalated hydrotalcite functional material MgAl-LDHs and an organic matter were added and returned to the saline alkali pool to comprehensively improve the saline alkali soil 7 and achieve the control of the saline alkali land.

(9) 50 g light saline alkali soil was weighed, and the total salt content was 1.06 g. The method in embodiment 1 was used. The amount of salt extracted for the first time was 0.39 g, and the desalination rate was 36.79%. The amount of salt extracted for the second time was 0.15 g, and the desalination rate was 14.15%. The amount of salt extracted for the third time was 0.11 g, and the desalination rate was 10.38%. The amount of salt extracted for the fourth time was 0.05 g, and the desalination rate was 4.72%. The amount of salt extracted for the fifth time was 0.01 g, and the desalination rate was 0.94%. The total desalination rate was 66.98%. 50 g heavy saline alkali soil was weighed, and the total salt content was 30.53 g. The method in embodiment 1 was used. The amount of salt extracted for the first time was 15.49 g, and the desalination rate was 50.74%. The amount of salt extracted for the second time was 4.77 g, and the desalination rate was 15.62%. The amount of salt extracted for the third time was 1.59 g, and the desalination rate was 5.21%. The amount of salt extracted for the fourth time was 0.22 g, and the desalination rate was 0.72%. The amount of salt extracted for the fifth time was 0.03 g, and the desalination rate was 0.01%. The total desalination rate was 72.39%.

Embodiment 2

Figure 3:
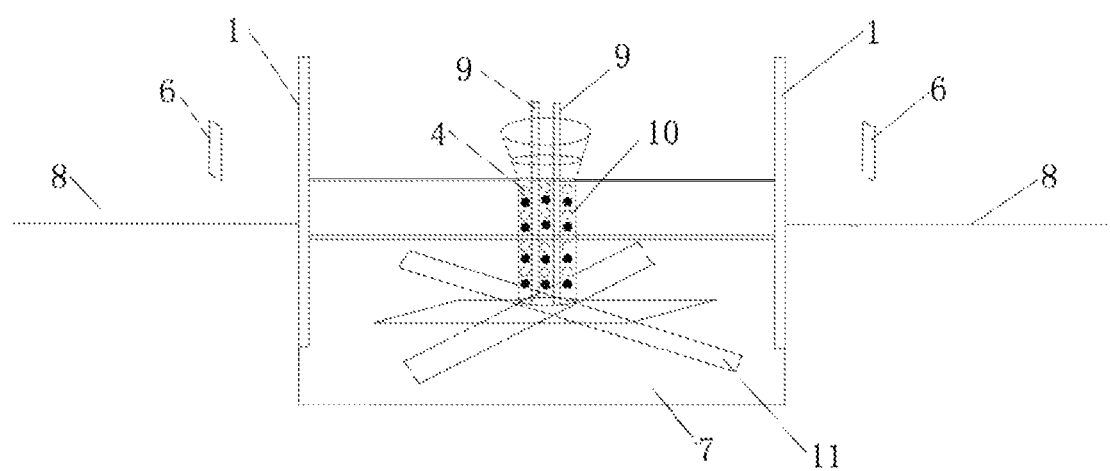
FIG. 3 is a schematic diagram of the structure when the vermiculite or evaporating material is placed only in the cylinder provided by the present disclosure.

The method for extracting and separating salt alkali and soil improvement, as shown in FIG. 1 and FIG. 3, specifically included the following steps.
(1) A foundation pit was excavated on a saline alkali land, a square convex edge was built, and a partition was set around inner side. The depth of the partition into the soil was 3 m, and the protruding height was 5 m. The water was added till the water level height was 2 m. And a saline alkali pool with an area of 200 m$^2$ as shown in FIG. 2 was obtained.
(2) A cylinder 10 was arranged in the center of the saline alkali pool, and multiple cylinder bottom plates 11 were also arranged at the bottom of the cylinder 10. The cylinder bottom plates 11 were arranged in the saline alkali soil 7.
(3) A raw vermiculite was expanded at 1000° C. to obtain an expanded vermiculite. The expanded vermiculite precursor was obtained by adding cobalt catalyst and selenium light absorbing material, and then the evaporating material 4 (vermiculite based carbon nanotube composite saline alkali soil adsorption) was obtained by catalysis.
(4) The evaporating material 4 was added to the cylinder 10. The saline alkali soil 7 under the saline alkali pool absorbed heat, evaporated and precipitated salt alkali under the sunlight, and the salt alkali were enriched on the evaporating material 4. Then the evaporating material saline alkali mixture was obtained. And a solar substrate 6 was placed on the cylindrical partition 1 to convert solar energy into electric energy for storage. And at the same time, an electric heating wire 9 was arranged in the evaporating material 4 to continue the evaporation through the electric heating wire 9 at night.
(5) The evaporating material saline alkali mixture was dissolved, separated and washed to obtain the saline alkali solution and the evaporating material 4 for recycling.
(6) The evaporating material 4 was returned to the saline alkali pool and step (4) and step (5) were repeated more than three times. Saline alkali ions in the saline alkali soil 7 were enriched and collected together for standby to realize a basically complete separation and extraction of salt alkali in the saline alkali soil 7.
(7) 1 mol/L ammonia and 1 mol/L organic intercalation agent were added into the repeatedly recovered saline alkali solution for reaction to obtain an intercalated Mg—Al hydrotalcite. The intercalated Mg—Al hydrotalcite is recrystallized to obtain a layered intercalated hydrotalcite functional material MgAl-LDHs.
(8) The expanded vermiculite was modified, crushed and sieved with a 120-mesh sieve to obtain a fine-grained vermiculite, then the layered intercalated hydrotalcite functional material MgAl-LDHs and animal manure were added and returned to the saline alkali pool to comprehensively improve the saline alkali soil 7 and achieve the control of the saline alkali land.
(9) 50 g light saline alkali soil was weighed, and the total salt content was 1.06 g. The method in embodiment 2 was used. The amount of salt extracted for the first time was 0.43 g, and the desalination rate was 40.57%. The amount of salt extracted for the second time was 0.17 g, and the desalination rate was 16.04%. The amount of salt extracted for the third time was 0.13 g, and the desalination rate was 12.26%. The amount of salt extracted for the fourth time was 0.08 g, and the desalination rate was 7.55%. The amount of salt extracted for the fifth time was 0.02 g, and the desalination rate was 1.89%. The total desalination rate was 78.30%. 50 g heavy saline alkali soil was weighed, and the total salt content was 30.53 g. The method in embodiment 2 was used. The amount of salt extracted for the first time was 17.52 g, and the desalination rate was 57.39%. The amount of salt extracted for the second time was 4.90 g, and the desalination rate was 16.05%. The amount of salt extracted for the third time was 1.62 g, and the desalination rate was 5.31%. The amount of salt extracted for the fourth time was 0.23 g, and the desalination rate was 0.75%. The amount of salt extracted for the fifth time was 0.04 g, and the desalination rate was 0.01%. The total desalination rate was 79.63%.

Embodiment 3

Figure 4:
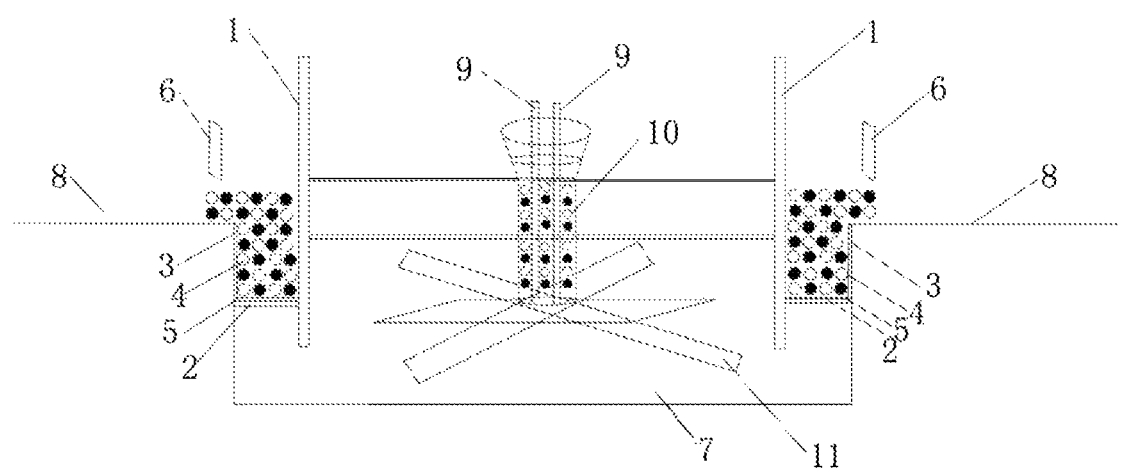
FIG. 4 is a schematic diagram of the structure when the vermiculite or evaporating material is simultaneously placed in the trench and the cylinder provided by the present disclosure.

The method for extracting and separating salt alkali and soil improvement, as shown in FIG. 1 and FIG. 4, specifically included the following steps.
(1) A foundation pit was excavated on a saline alkali land, a square convex edge was built, and a cylindrical partition 1 was set around inner side. The depth of the cylindrical partition 1 into the soil was 2 m, and the protruding height was 3 m. The water was added till the water level height was 1 m. And a saline alkali pool with an area of 100 m$^2$ as shown in FIG. 2 was obtained.
(2) A trench with a width of 3 m was set around the saline alkali pool, and the bottom of the trench was 0.5 m below the plane of the saline alkali pool. A cylinder 10 was arranged in the center of the saline alkali pool, and multiple cylinder bottom plates 11 were also arranged at the bottom of the cylinder 10. The cylinder bottom plates 11 were arranged in the saline alkali soil 7.
(3) A raw vermiculite was expanded at 800° C. to obtain an expanded vermiculite. The expanded vermiculite precursor was obtained by adding ferrocene catalyst and titanium light absorbing material, and then the evaporating material 4 (vermiculite based carbon nanotube composite saline alkali soil adsorption) was obtained by catalysis.
(4) A trench side partition 3 and a trench bottom partition 2 with holes were placed at bottom on both sides of the trench, then a water permeable and breathable black plastic woven bag 5 was laid in the trench side partition 3 and the trench bottom partition 2 with holes at bottom, and the evaporating material 4 was laid evenly on the black plastic woven bag 5. The saline alkali soil 7 in the trench around the saline alkali pool and under the saline alkali pool absorbed heat, evaporated and precipitated salt alkali under the sunlight, and the salt alkali were enriched on the evaporating material 4. Then the evaporating material saline alkali mixture was obtained.

And a solar substrate 6 was placed on the cylindrical partition 1 to convert solar energy into electric energy for storage. And at the same time, an electric heating wire 9 was arranged in the evaporating material 4 to continue the evaporation through the electric heating wire 9 at night.

(5) The evaporating material saline alkali mixture was dissolved, separated and washed to obtain the saline alkali solution and the evaporating material 4 for recycling.

(6) The evaporating material 4 was returned to the saline alkali pool and step (4) and step (5) were repeated more than three times. Saline alkali ions in the saline alkali soil 7 were enriched and collected together for standby to realize a basically complete separation and extraction of salt alkali in the saline alkali soil 7.

(7) 0.5 mol/L urea solution and 0.5 mol/L aluminum intercalation agent were added into the repeatedly recovered saline alkali solution for reaction to obtain an intercalated Mg—Al hydrotalcite. The intercalated Mg—Al hydrotalcite is recrystallized to obtain a layered intercalated hydrotalcite functional material MgAl-LDHs.

(8) The expanded vermiculite was modified, crushed and sieved with a 80-mesh sieve to obtain a fine-grained vermiculite, then the layered intercalated hydrotalcite functional material MgAl-LDHs and wood vinegar were added and returned to the saline alkali pool to comprehensively improve the saline alkali soil 7 and achieve the control of the saline alkali land.

(9) 50 g light saline alkali soil was weighed, and the total salt content was 1.06 g. The method in embodiment 3 was used. The amount of salt extracted for the first time was 0.49 g, and the desalination rate was 46.23%. The amount of salt extracted for the second time was 0.20 g, and the desalination rate was 18.87%. The amount of salt extracted for the third time was 0.16 g, and the desalination rate was 15.09%. The amount of salt extracted for the fourth time was 0.11 g, and the desalination rate was 10.38%. The amount of salt extracted for the fifth time was 0.04 g, and the desalination rate was 3.78%. The total desalination rate was 94.34%. 50 g heavy saline alkali soil was weighed, and the total salt content was 30.53 g. The method in embodiment 3 was used. The amount of salt extracted for the first time was 19.71 g, and the desalination rate was 64.56%. The amount of salt extracted for the second time was 5.08 g, and the desalination rate was 16.64%. The amount of salt extracted for the third time was 1.66 g, and the desalination rate was 5.44%. The amount of salt extracted for the fourth time was 0.25 g, and the desalination rate was 0.82%. The amount of salt extracted for the fifth time was 0.05 g, and the desalination rate was 0.02%. The total desalination rate was 87.62%.

The above experiments show that the device is more conducive to the precipitation of salt alkali for heavy saline alkaline soil.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A method for extracting and separating salt alkali from saline alkali soil and soil improvement, comprising the following steps:

(1) excavating a foundation pit on a saline alkali land, building a square convex edge, setting a cylindrical partition around inner side, adding a nitric acid solution or phosphoric acid solution, and obtaining a saline alkali pool;

(2) setting a trench around the saline alkali pool, wherein a bottom of the trench is lower than a plane of the saline alkali pool; and/or, setting a cylinder in a center of the saline alkali pool;

(3) expanding a raw vermiculite to obtain an expanded vermiculite precursor, adding a catalyst and a light absorbing material, mixing evenly, and then performing a catalysis to obtain an evaporating material;

(4) placing a trench side partition and a trench bottom partition with holes at bottom on both sides of the trench, then laying a plastic wrapping material in the trench side partition or the trench bottom partition with holes at bottom, and laying the vermiculite or the evaporating material evenly on the plastic wrapping material; and/or, adding the vermiculite or the evaporating material into the cylinder; making the saline alkali soil absorb heat, evaporate and precipitate the salt alkali under the sunlight, and enriching the salt alkali on the vermiculite or the evaporating material to obtain a vermiculite or evaporating material saline alkali mixture;

(5) dissolving, separating and washing the vermiculite or evaporating material saline alkali mixture to obtain a saline alkali solution and the vermiculite or evaporating material for recycling;

(6) returning the vermiculite or evaporating material to the saline alkali pool and repeating step (4) and step (5) more than three times, enriching saline alkali ions in the saline alkali soil, collecting them together for standby to realize a basically complete separation and extraction of the salt alkali in the saline alkali soil;

(7) adding an alkali solution and an intercalation agent into the repeatedly recovered saline alkali solution for reaction to obtain an intercalated Mg—Al hydrotalcite; recrystallizing the intercalated Mg—Al hydrotalcite to obtain a layered intercalated hydrotalcite functional material MgAl-LDHs; and (8) modifying, crushing and sieving the expanded vermiculite to obtain a fine-grained vermiculite, then adding and returning the layered intercalated hydrotalcite functional material MgAl-LDHs and an organic matter to the saline alkali pool to comprehensively improve the saline alkali soil and achieve the control of the saline alkali land.

2. The method for extracting and separating salt alkali from saline alkali soil and soil improvement of claim 1, wherein in step (1), an area of the saline alkali pool is 1-200 m$^2$; a depth of the cylindrical partition into the soil is 0.5-3 m, a protruding height of the inner side is 0.1-5 m, and the outer side is 1-5 cm above the bottom.

3. The method for extracting and separating salt alkali from saline alkali soil and soil improvement of claim 1, wherein in step (1), a water level height after adding the nitric acid solution or phosphoric acid solution is 0.01-2 m;

a concentration of the nitric acid solution and phosphoric acid solution is 0.001-0.1 mol/L.

4. The method for extracting and separating salt alkali from saline alkali soil and soil improvement of claim 1, wherein in step (2), a width of the trench is 0.1-5 m and a bottom of the trench is 0.1-1 m lower than the plane of the saline alkali pool.

5. The method for extracting and separating salt alkali from saline alkali soil and soil improvement of claim 1, wherein in step (2), a plurality of cylinder bottom plates are arranged at the bottom of the cylinder, and the cylinder bottom plates are arranged in the saline alkali soil.

6. The method for extracting and separating salt alkali from saline alkali soil and soil improvement of claim 1, wherein in step (3), an expansion temperature is 500-1000° C., the catalyst is at least one of ferrocene, iron, cobalt and nickel, and the light absorbing material is titanium and/or selenium.

7. The method for extracting and separating salt alkali from saline alkali soil and soil improvement of claim 1, wherein in step (4), the plastic wrapping material is a porous wrapping material or a black plastic woven bag, and the plastic wrapping material is water permeable and breathable, and can quickly transport salt ion aqueous solution.

8. The method for extracting and separating salt alkali from saline alkali soil and soil improvement of claim 1, wherein step (4) further comprises: placing a solar substrate on the surrounding partition and the cylinder to convert solar energy into electric energy for storage, and at the same time, arranging an electric heating wire in the vermiculite or evaporating material to continue the evaporation through the electric heating wire at night.

9. The method for extracting and separating salt alkali from saline alkali soil and soil improvement of claim 1, wherein in step (7), the alkali solution is at least one of urea, sodium hydroxide, ammonia and potassium hydroxide, with a concentration of 0.1-1 mol/L, and the intercalation agent is an organic substance of nitrogen, phosphorus, potassium and sulfur, at least one of calcium, magnesium, iron, zinc, copper, manganese, molybdenum and boron, with a concentration of 0.1-1 mol/L.

10. The method for extracting and separating salt alkali from saline alkali soil and soil improvement of claim 1, wherein in step (8), a mesh size of the fine-grained vermiculite and organic matter sieved is at least one of 10 mesh, 20 mesh, 40 mesh, 60 mesh and 80 mesh, and the organic matter is at least one of wood vinegar, organic fertilizer, soil regulator, lysine, animal manure, biomass charcoal and straw leaf ash.

* * * * *